(12) United States Patent
Kilpi

(10) Patent No.: US 8,525,735 B2
(45) Date of Patent: Sep. 3, 2013

(54) FOLDABLE/SLIDEABLE APPARATUS FOR RADIO COMMUNICATION WITH BACKSPACE FOR AN ANTENNA

(75) Inventor: Pekka Kilpi, Helsinki (FI)

(73) Assignee: Nokia Corporation, Espoo (FI)

( * ) Notice: Subject to any disclaimer, the term of this patent is extended or adjusted under 35 U.S.C. 154(b) by 968 days.

(21) Appl. No.: 12/599,496

(22) PCT Filed: May 7, 2007

(86) PCT No.: PCT/EP2007/004349
§ 371 (c)(1),
(2), (4) Date: Nov. 9, 2009

(87) PCT Pub. No.: WO2008/135070
PCT Pub. Date: Nov. 13, 2008

(65) Prior Publication Data
US 2010/0302107 A1 Dec. 2, 2010

(51) Int. Cl.
*H01Q 1/24* (2006.01)
(52) U.S. Cl.
USPC .............. 343/702; 455/575.4; 455/575.7
(58) Field of Classification Search
USPC .................. 343/702; 455/575.3–7
See application file for complete search history.

(56) References Cited

U.S. PATENT DOCUMENTS

| | | | | |
|---|---|---|---|---|
| 6,677,903 B2 * | 1/2004 | Wang | | 343/702 |
| 7,274,335 B2 * | 9/2007 | Kim et al. | | 343/702 |
| 7,456,794 B2 * | 11/2008 | Sakamoto et al. | | 343/702 |
| 7,840,243 B2 * | 11/2010 | Hirai | | 455/575.7 |
| 7,880,678 B2 * | 2/2011 | Degner et al. | | 343/702 |
| 7,962,186 B2 * | 6/2011 | Cui et al. | | 455/575.7 |
| 8,260,385 B2 * | 9/2012 | Kim et al. | | 455/575.7 |
| 2001/0009847 A1 * | 7/2001 | Kim et al. | | 455/90 |
| 2002/0080074 A1 * | 6/2002 | Wang | | 343/700 MS |
| 2003/0201945 A1 * | 10/2003 | Reece et al. | | 343/795 |
| 2005/0049019 A1 * | 3/2005 | Lee | | 455/575.4 |
| 2005/0179602 A1 | 8/2005 | Ryu et al. | | |
| 2005/0208985 A1 * | 9/2005 | Park et al. | | 455/575.4 |
| 2009/0239595 A1 * | 9/2009 | Sung et al. | | 455/575.7 |
| 2012/0274518 A1 * | 11/2012 | Ying | | 343/702 |

FOREIGN PATENT DOCUMENTS

| | | |
|---|---|---|
| EP | 1612953 A | 1/2006 |
| EP | 1672878 A | 6/2006 |
| WO | 2006077983 A | 7/2006 |

OTHER PUBLICATIONS

International Search Report and Written Opinion for Corresponding PCT Application No. PCT/EP2007/004349 sent on Mar. 18, 2008, p. 1-13.

* cited by examiner

*Primary Examiner* — Douglas W Owens
*Assistant Examiner* — Jennifer F Hu
(74) *Attorney, Agent, or Firm* — Nokia Corporation

(57) ABSTRACT

An apparatus for radio communication comprising an antenna element and first and second parts, wherein the apparatus is arranged such that the first and second parts are movable with respect to one another between first and second configurations, and wherein movement of the apparatus from the first configuration into the second configuration provides a backspace which can be used as a backspace for the antenna element.

16 Claims, 6 Drawing Sheets

FOLDABLE/SLIDEABLE APPARATUS FOR RADIO COMMUNICATION WITH BACKSPACE FOR AN ANTENNA

RELATED APPLICATION

This application was originally filed as PCT Application No. PCT/EP2007/004349 on May 7, 2007, which is incorporated herein by reference in its entirety.

The invention relates to an apparatus for radio communication comprising an antenna element and first and second parts, wherein the apparatus is arranged such that the first and second parts are (e.g. slideably/rotatably) movable with respect to one another between first and second configurations, and a method of operating the apparatus. The invention can be applied to (although not limited to) radio communication devices having first/second configurations similar or the same as provided, for example, by Nokia N65™, 8800™, 8910™ and N61™ devices. The apparatus relates to associated methods, including associated methods of assembly of such apparatus.

The antenna element is used to communicate over the air interface with associated short range apparatus (e.g. in the case the antenna element is configured for using Bluetooth™ (BT), Radio Frequency Identification (RFID), and/or Wireless Local Area Network (WLAN) transmission protocols) or long range apparatus (e.g. in the case of mobile telephony/ Global Positioning System (GPS) transmission protocols). Although such apparatus may be used to provide mobile telephony, they may in addition or alternatively to such functions provide, for example, transmission of pre-recorded/live still/video images and/or other data (e.g. including pre-recorded/live data such as sound), and/or payment for products/ services (e.g. payment of transportation tickets).

BACKGROUND

Present and future mobile phones include a multitude of antennas besides the cellular antennas, some of which do not need to be used all of the time. Besides the present BT and WLAN antennas, these include DVB-H (digital video broadcast—handheld), RF-ID (radio frequency identification), and UWB (ultra wide band) antennas, which are used only occasionally (for example, like when paying for tickets or watching a broadcast).

Antennas need a certain amount of space from other metallic objects within the device in order for them to radiate efficiently. This space is referred to as a backspace. Usually, the backspace needs to be metal free, and preferably plastics free. As a result of the backspace, although the antenna itself can be very thin, the total space required can be quite large, especially with DVB-H and RF-ID antennas. The backspace may not necessarily be an enclosed volume.

The listing or discussion of a prior-published document in this specification should not necessarily be taken as an acknowledgement that the document is part of the state of the art or is common general knowledge.

Summary

According to a first aspect, there is provided an apparatus for radio communication comprising an antenna element and first and second parts, wherein the apparatus is arranged such that the first and second parts are movable with respect to one another between first and second configurations, and wherein movement of the apparatus from the first configuration into the second configuration provides a backspace which can be used as a backspace for the antenna element.

The apparatus may be arranged such that it does not provide an antenna element backspace sufficient for use of the antenna element in the first configuration.

The apparatus may be arranged such that the antenna element is usable in a first bandwidth in the first configuration and in a second bandwidth in the second configuration, wherein the second bandwidth is higher than the first bandwidth. The first bandwidth may provide for one of reception/ transmission of signalling over the air interface, and the second bandwidth may provide for transmission and reception of signalling over the air interface.

The apparatus may be arranged such that the first and second parts are arranged to be moveable with respect to one another by sliding movement. The apparatus may be arranged such that the first and second parts are arranged to be moveable with respect to one another by rotating movement. The apparatus may be arranged such that the first and second parts are arranged to be moveable with respect to one another along a single (e.g. X-Y, Z) plane. The apparatus may be arranged such that the first and second parts are arranged to be moveable with respect to one another along both horizontal (e.g. X-Y) and vertical (e.g. Z) planes.

The apparatus may be arranged such that movement of the apparatus from the first configuration into the second configuration reveals a cavity which can be used as a backspace for the antenna element.

The cavity may not be present in the first configuration.

Movement of the apparatus from the first configuration to the second configuration may move a cavity present in the first configuration over the antenna element in the second configuration, the cavity providing the backspace for the antenna element.

There may be no significant backspace over the antenna element in the first configuration.

The cavity may have a first size in the first configuration and a second, larger size in the second configuration.

The cavity may be substantially free of metal.

The cavity may be substantially free of plastics. The cavity may be defined and revealed within the apparatus.

The cavity may be defined by one or more of a user interface (an input/output element, e.g. keyboard/display) and a hardware engine (e.g. a PWB comprising processing circuitry).

The cavity may be defined by walls comprised substantially of non-conductive materials.

The antenna element may be fixed on the first or second part to be movable with the (e.g. sliding) movement of the first or second part.

The antenna element may be fixed on the first part and antenna element processing circuitry may be comprised on the second part. The apparatus may comprise one or more connection elements to allow the antenna element and the antenna element processing circuitry to remain connected during (e.g. slideable) movement of the first and second parts.

The antenna element may be comprised on a removable first/second part and may comprise .a coupling to allow releasable (direct/indirect) coupling to associated antenna element processing circuitry.

One or both of the first and second parts may be an external housing for the apparatus.

The first and second parts may be user-removable housings for the apparatus and the antenna element may be comprised on one of the user-removable first and second parts.

The first configuration may be a closed configuration and the second configuration may be an open configuration.

The first configuration may be a standby configuration and the second configuration may be an in-use configuration.

The first configuration may be an apparatus/antenna element standby configuration and the second configuration may be an antenna element in-use configuration.

The antenna element may be in use in the second configuration and not the first configuration.

The antenna element may be usable for one or more short range transmission protocols.

The antenna element may be usable for one or more long range transmission protocols.

The antenna element may be usable for, and not limited to, one or more of

Bluetooth, WLAN, DVB-H, AM, RF-ID, UWB, GPS, Cellular (for example, GSM, EGSM, PCN, DCS, WCDMA, CDMA, TDMA protocols.), Wibree, WiMax, DRM (Digital Radio Mondiale), FM RX (FM Reception of Broadcasts), FM Tx (FM Transmit), and DAB (Digital Audio Broadcasting) transmission protocols.

The apparatus may comprise an additional antenna element which is configured for use in the first apparatus configuration. The additional antenna element may also be configured for use in the second configuration.

The antenna element comprises a diversity antenna element.

The antenna element may be a diversity antenna element and be supplemental to an additional antenna element such that, when the apparatus is in the second configuration, the diversity antenna element has a sufficient backspace to be efficiently useable, and when the apparatus is in the first configuration, the diversity antenna element is not efficiently useable. In such embodiments, the apparatus may be configured such that the additional antenna element may be useable in the first configuration in a non-diversity mode and be useable in a diversity mode in the second configuration.

The antenna element may be capable of being used in a closed configuration of the first and second parts. For example, when the first and second parts are in the closed configuration, the antenna element may work solely in the receive spectrum of the radio protocol being employed, in other words the antenna is working in a narrowband situation. When the first and second parts are in the open configuration, then the antenna element bandwidth may naturally increase, and the antenna element may therefore be operating in both receive and transmit regions of the spectrum, in other words the antenna is now working in a wider band situation relative only to the closed configuration antenna operation mode (not to be confused with "wideband" as this is a relative term).

The apparatus may be arranged for receiving a video transmission. The apparatus may be arranged for receiving a telecommunications transmission. The apparatus may be a radio telecommunications device. The apparatus may use the aforementioned antenna element or some other antenna element for receiving said transmissions.

The apparatus may be a hand-portable radio communications device.

According to a second aspect, there is provided a method of operating an apparatus for radio communication comprising an antenna element and first and second parts, wherein the apparatus is arranged such that the first and second parts are movable with respect to one another between first and second configurations, the method comprising moving the apparatus from the first configuration into the second configuration to provide a backspace which can be used as a backspace for the antenna element.

According to a third aspect, there is provided an apparatus for radio communication comprising first and second means for housing and means for receiving a signal, wherein the apparatus is arranged such that the first and second means for housing are movable with respect to one another between first and second configurations, and wherein movement of the apparatus from the first configuration into the second configuration provides a backspace which can be used as a means for providing a backspace for the means for receiving a signal.

According to a fourth aspect, there is provided a method of operating an apparatus for radio communication comprising first and second means for housing and means for receiving a signal, wherein the apparatus is arranged such that the first and second means for housing are movable with respect to one another between first and second configurations, the method comprising the step of moving the apparatus from the first configuration into the second configuration to provide a backspace which can be used as a means for providing a backspace for the means for receiving a signal.

According to a fifth aspect, the present invention provides a computer program for detecting the configuration of an apparatus for radio communication, the apparatus comprising an antenna element and first and second parts, wherein the apparatus is arranged such that the first and second parts are movable with respect to one another between first and second configurations, and wherein movement of the apparatus from the first configuration into the second configuration provides a backspace which can be used as a backspace for the antenna element, and wherein the computer program is arranged to detect signalling associated with the configuration of the apparatus and provide signalling to move the apparatus between powered up and powered down states based on the detected configuration of the apparatus.

According to a sixth aspect, the present invention provides a method of controlling the power state of an apparatus, the apparatus for radio communication, the apparatus comprising an antenna element and first and second parts, wherein the apparatus is arranged such that the first and second parts are movable with respect to one another between first and second configurations, and wherein movement of the apparatus from the first configuration into the second configuration provides a backspace which can be used as a backspace for the antenna element, and wherein the method comprises detecting (e.g. signalling associated with) the configuration of the apparatus and moving the apparatus between powered up and powered down states (e.g. by providing signalling) based on the detected configuration of the apparatus.

The powered up/down states may be the power states of circuitry for transmission using the antenna element.

The present invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

A description is now given, by way of example only, with reference to the accompanying drawings, in which.

DETAILED DESCRIPTION OF SPECIFIC EMBODIMENTS

Figure 1:
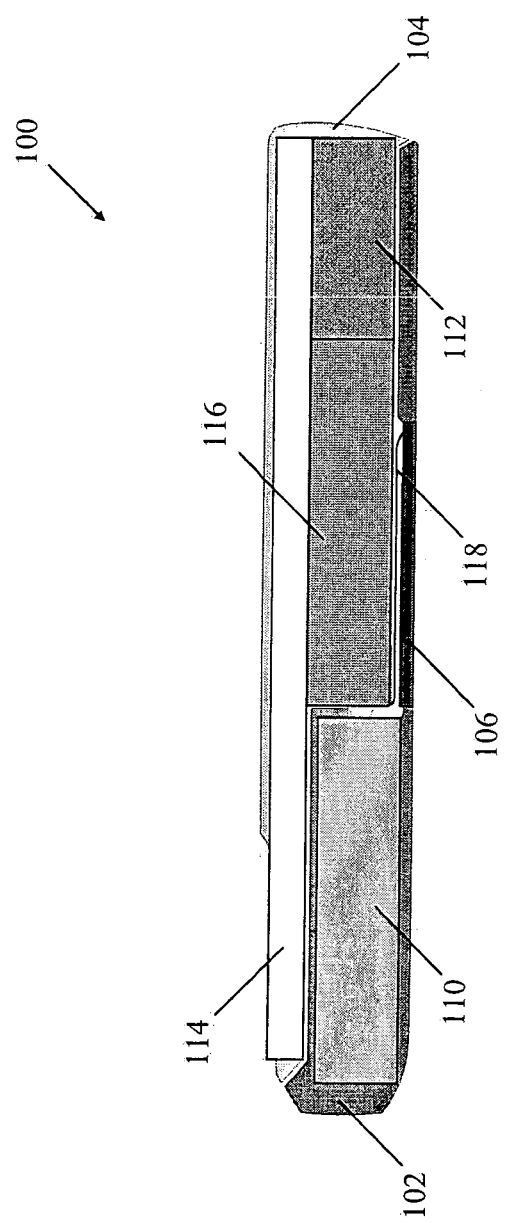
FIG. 1 shows an apparatus for radio communication in a first configuration.
Figure 2:
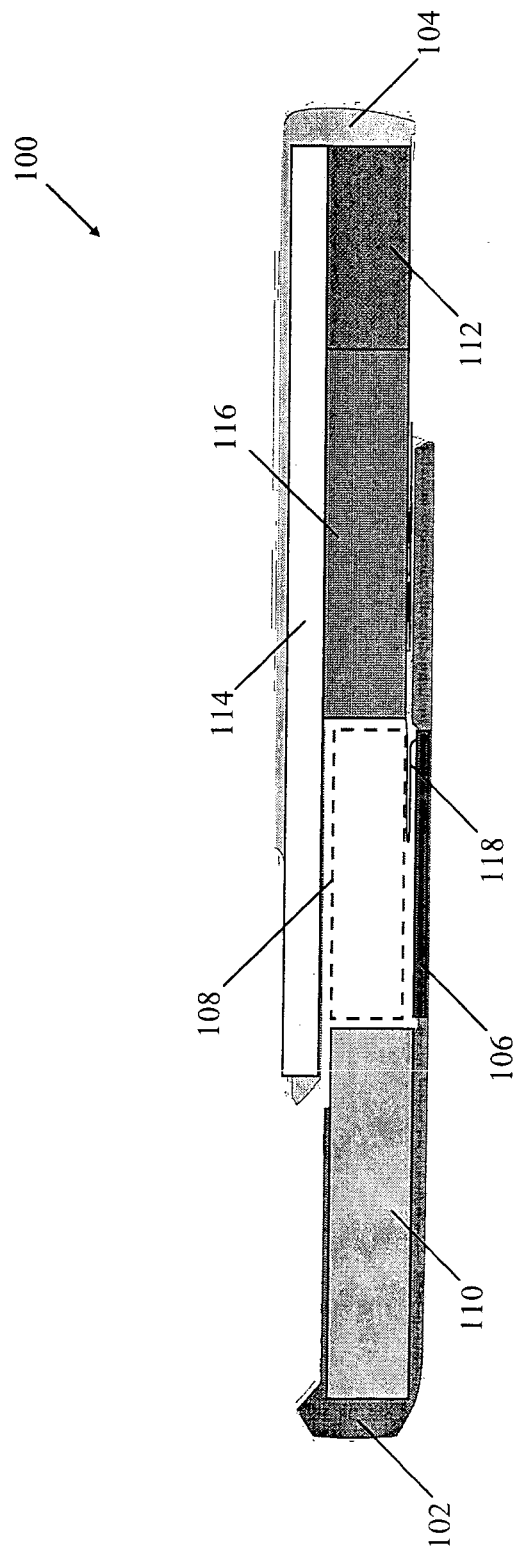
FIG. 2 shows the apparatus of FIG. 1 in a second configuration.

FIGS. 1 and 2 show an apparatus 100. The apparatus 100 is a hand-portable radio communications device and is arranged for receiving video transmissions and telecommunications transmissions. The apparatus 100 comprises a first part 102, a second part 104, an antenna element 106, a battery-and-T9-user-interface module 110, a cellular antenna 112, a display-and-S60-keys module 114 (which comprises input/output elements, e.g. a keypad and display), and an engine 116 (which comprises a printed wiring board (PWB) having antenna element processing circuitry). It will be appreciated that other embodiments may not necessarily be configured for use with a S60 operating system.

The first and second parts 102, 104 are external housings for the apparatus 100. In other embodiments the first and second parts 102, 104 need not be the external housings but some supporting structure on which, for example, external housings may be mounted/supported.

The apparatus 100 is arranged such that the first and second parts 102, 104 are slideably movable with respect to one another between first and second configurations, shown in FIGS. 1 and 2 respectively. The first configuration is a closed, standby configuration and the second configuration is an open, in-use configuration. The antenna element 106 is fixed on the first part 102 to be movable with the sliding movement of the first part 102.

Although the antenna element 106 is shown fixed to the inside face of the first part 102, it could be fixed to the side of the first part 102 (particularly in the case that the antenna element 106 is a GPS antenna). The antenna element processing circuitry in the engine 116 is comprised on the second part 104. The apparatus 100 comprises connection elements 118, for example dynamic microcoaxial cables, to allow the antenna element 106 and the antenna element processing circuitry in the engine 116 to remain connected during sliding movement of the first and second parts 102, 104.

In a variant, the first and second parts 102, 104 are user-removable housings for the apparatus 100 and the antenna element 106 is comprised on the user-removable first part 102. The connection elements 118 allow releasable coupling to the associated antenna element processing circuitry in the engine 116.

Movement of the apparatus 100 from the first configuration into the second configuration produces a cavity 108 (see FIG. 2), which is used as a backspace for the antenna element 106. As seen in FIG. 2, the cavity 108 is defined by walls of the battery-and-T9-user-interface module 110, the antenna element 106, the display-and-S60-keys module 114, and the engine 116. The remaining two walls of the cavity 108 are formed by the first and/or second parts 102, 104. (For reasons of clarity, these walls are not shown in FIG. 2.) The cavity 108 is produced when the opposing walls of the battery-and-T9-user-interface module 110 and the engine 116 move away from each other. The walls defining the cavity 108 are comprised substantially of non-conductive materials.

The cavity 108 is substantially free of metal and plastics and is defined and revealed within the apparatus 100. The cavity 108 is not present in the first configuration, and there is no significant backspace over the antenna element 106 in the first configuration. (Alternatively, it could be said that the cavity 108 has a first size in the first configuration and a second, larger size in the second configuration.) Thus, the antenna element 106 is in use (or can more readily be used) in the second configuration but not in the first configuration.

In one embodiment, the antenna element 106 is a DVB-H antenna. In other embodiments, the antenna element 106 is an RF-ID antenna, a UWB antenna, a Bluetooth antenna, a WLAN antenna, a GPS antenna, or an antenna for any other transmission (receiving and/or transmitting) protocols.

In use, a user of the apparatus 100 moves the first and second parts 102, 104 into the second, open configuration when he wants to use features involving the antenna element 106, thereby creating the cavity 108 and providing the antenna element 106 with a usable backspace. In the first configuration, there is no backspace for the antenna element 106, which provides for a compact arrangement of the apparatus 100.

The apparatus may be arranged such that processing circuitry in the engine 116 (and/or associated user interface circuitry) is automatically moved to an active state (from a powered down state) upon movement of the apparatus 100 into the second configuration. Thus, the apparatus 100 is ready for transmission (receiving/transmitting) over the air interface using the antenna element 106 when placed in the second configuration. Such an apparatus would have appropriate sensors for detecting the configuration of the device to generate appropriate signalling, and associated computer programs for moving the apparatus between the active (power up) state and power down states based upon detection of apparatus configuration. The power states of the device may be associated with power states of (transmission) circuitry for the antenna element.

In some embodiments, the features which use the antenna element 106 are not needed when the apparatus 100 is in the first, closed configuration. For example, in the case that the antenna element 106 is a broadcast reception antenna for DVB-H, the antenna element 106 could be employed for watching digital TV on the apparatus 100 and, as the apparatus 100 would have to be in the open configuration to view the display of the display-and-S60-keys module 114, the cavity 108 can be used for the receive-only antenna element 106 for this function.

Figure 3:
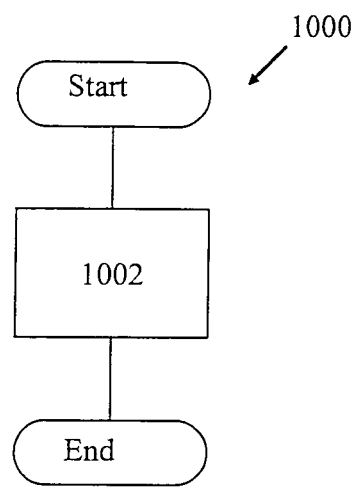
FIG. 3 is a flowchart representing a method of operating an apparatus for radio communication.

FIG. 3 is a flowchart representing a method 1000 of operating the apparatus 100. The method comprises moving 1002 the apparatus from the first configuration into the second configuration to reveal the cavity 108, which can be used as a backspace for the antenna element 106.

Figure 4:
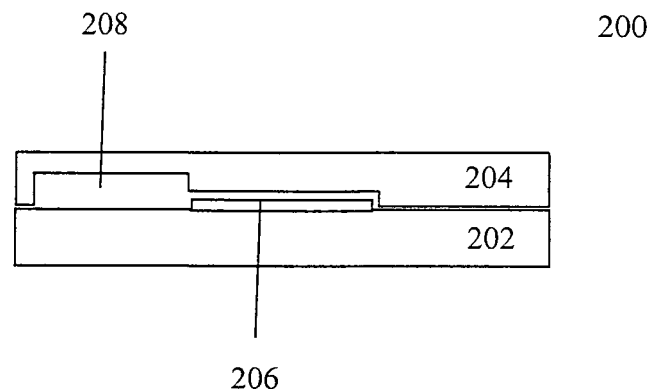
FIGS. 4 and 5 show an apparatus according to one embodiment in respective first/second (closed/open) configurations.
Figure 5:
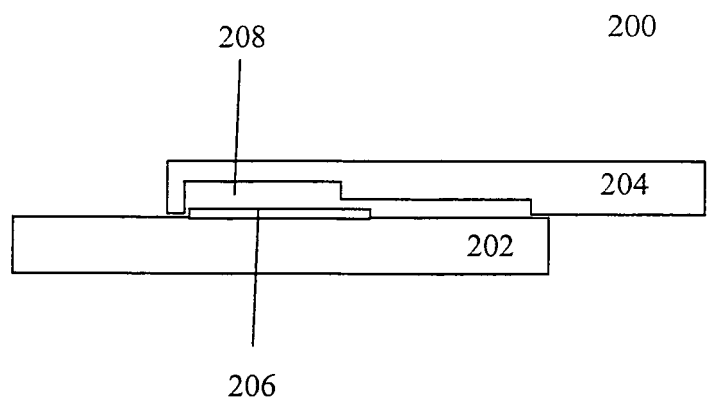

FIGS. 4 and 5 show a further embodiment of an apparatus 200. In this apparatus 200, the cavity 208 is present in the first configuration (FIG. 4) and moves over the antenna element 206 in the second configuration (FIG. 5) when the parts 202, 204 are slideably moved with respect to one another. Although the embodiments of FIGS. 4 and 5 have the antenna element 206 shown to be located centrally within the device 200, in other embodiments, the antenna element 206 may be placed away from the centre of the device and be located more towards an extremity (e.g. outer face) of the device 200.

In this embodiment, the cavity 208 does not extend over the entire surface area of the antenna element 206 in the second configuration. However, in other embodiments, the cavity 208 may be sized to extend over the entire surface area of the antenna element 206 in the second configuration. Furthermore, in the embodiment shown in FIGS. 4 and 5, the cavity 208 does not extend over the antenna element 206 in the first configuration. In other embodiments, the cavity 208 may partially extend over the antenna element 206 in the first configuration. Such variations may also be applicable to the apparatus 100 of FIGS. 1 and 2.

In a variation of this embodiment (not shown), the antenna element 206 may be biased (e.g. by some form of spring/biasing mechanism, not shown) such that when the device 200 is closed, the antenna element 206 is pushed down out of the way into the smaller/thinner space. However, with the opening of the device 200, the antenna element 206 may be (e.g. automatically) biased from the position shown in FIG. 5 towards and into the cavity which would now be above the location of the antenna element 206.

At a more general level, one or more embodiments may associate the first (e.g. closed) apparatus configuration with a retracted/stowed away antenna element position, and the second (e.g. open) apparatus configuration with an extended antenna element position. The antenna element positions may provide that the antenna element is not (e.g. efficiently) usable in the first retracted position, but usable in the second extended position. The antenna element positions may provide that the antenna element is usable in a first (e.g. one of transmission/reception) bandwidth in the first retracted position, and usable in a second (both transmission and reception) bandwidth in the second extended position. The second bandwidth may be higher the first. The movement between antenna element positions may be provided by biasing mechanisms (not shown).

Figure 6:
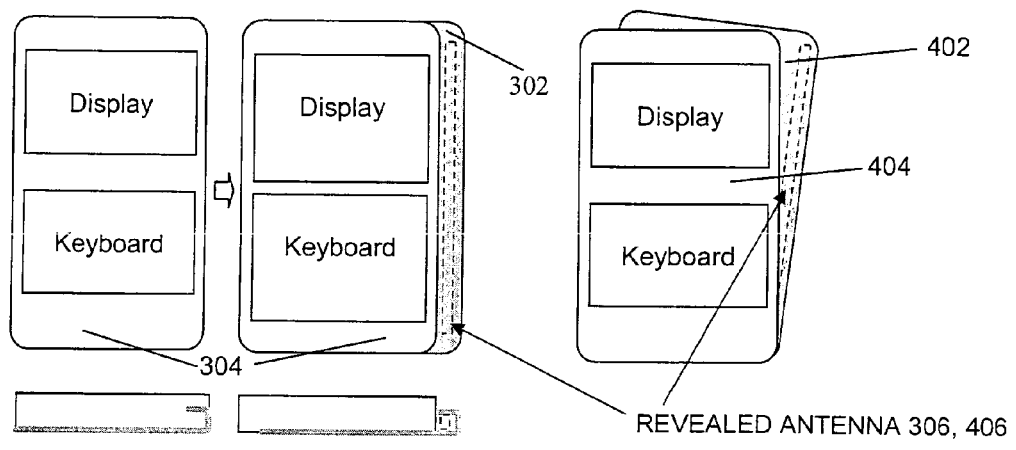
FIG. 6 shows apparatus according to further embodiments of the present invention.

FIG. 6 illustrates two further embodiments of the present invention (FIGS. 6a and 6b). FIG. 6a shows plan and side views of an electronic radio communications device 300 in a first (closed) configuration in which the antenna element 306, located on a lower part 302, is hidden by an overlying second part 304. In the second configuration, in which the second part 304 has moved laterally with respect to the first part 302, the antenna element 306 is revealed. In this embodiment, the relative movement of the first and second parts 302, 304 has only been along a horizontal (X-Y sliding) plane. In other embodiments, there may be only, or additional, movement in a vertical (Z) plane such that the first and second parts move away from one another in a vertical plane to reveal the antenna element 306.

FIG. 6b shows a further embodiment of the present invention in a second configuration (first configuration the same as FIG. 6a) in which first and second parts 402, 404 have been rotated with respect to one another to reveal an antenna element 406. In the specific embodiment of FIG. 6b, the first and second parts have been rotated with respect to one another about a single centre of rotation located towards a corner of the device 400. In other embodiments, there may be more than one centre of rotation, and the location of the respective centre of rotations may be more central to the device.

In the embodiments of FIG. 6, the antenna elements 306, 406 are located within the respective first parts 302, 402. In other embodiments, the antenna elements may be located such that when they are revealed, they are not within an enclosed housing cavity but external to the device 300, 400. In such a case, the antenna backspace can be considered to be infinite.

The antenna elements of the invention may not necessarily be positioned such that the antenna backspace extends away/towards a user interface surface (for example, if the antenna elements are located on a face parallel to the front user interface surface). In other embodiments, the antenna backspace may extend in a direction which is not substantially parallel (and which may be substantially perpendicular) to a user interface surface (e.g. a front user interface surface comprising a display and/or keypad). For example, the antenna element may be located on a face perpendicular (e.g. side face) to a face comprising the user interface.

Figure 7A:
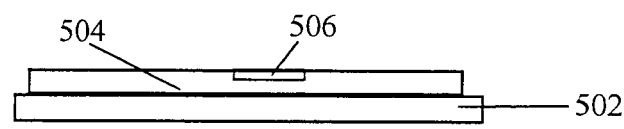
FIG. 7 shows side perspectives of a further embodiment of the present invention in first (FIG. 7a) and second (FIG. 7b) configurations.
Figure 7B:
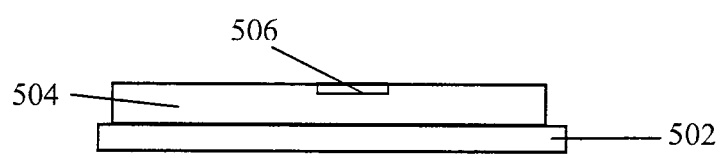

As previously mentioned, the first and second parts may be arranged to move away from one another in a vertical (e.g. Z) plane. Such an embodiment is shown in FIG. 7, in which the first lower part 502 houses the second upper part 504 such that the antenna element 506, which is attached with the second upper part 504, is moved away from the opposing face of the first lower part 502 to define a useable backspace cavity for the antenna element 506 when the apparatus is moved from a first closed configuration (FIG. 7a) to a second open configuration (FIG. 7b). In other embodiments, the antenna element may be located with the first lower part 502, and may be located towards an extremity of the apparatus 500 rather than central to the apparatus as shown in FIG. 7.

As previously mentioned, apparatus according to the present invention may encompass the provision of a backspace by relative movement of the parts in one or more planes. This may be simultaneous movement in multiple planes (e.g. X-Y, X-Z, Y-Z, X-Y-Z), or movement in one plane followed by movement in another plane. In the latter case, for example, the apparatus may be arranged such that the parts laterally slide away from one another (e.g. FIG. 5, 6a) before moving away from one another in the Z plane (FIG. 7). The movement between apparatus configurations may be aided by suitable biasing mechanisms.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus for radio communication comprising an antenna element and first and second parts, wherein the apparatus is configured such that the first and second parts are movable with respect to one another between first and second configurations, and wherein the apparatus is configured such that movement of the apparatus from the first configuration into the second configuration provides respective first and second backspaces for the antenna element which can be each be used to provide respective first and second operational bandwidths for the antenna element, and wherein the apparatus is configured such that movement of the apparatus from the first configuration to the second configuration moves a cavity present in the first configuration over the antenna element in the second configuration, the cavity providing second backspace for the antenna element.

2. An apparatus according to claim 1, wherein the apparatus is configured such that the antenna element is usable in the first operational bandwidth in the first configuration and in the second operational bandwidth in the second configuration, the second operational bandwidth being higher than the first bandwidth, the antenna element usable in the second higher operational bandwidth by virtue of the cavity provided to the antenna element.

3. An apparatus according to claim 1, wherein the first bandwidth provides one of reception/transmission of signalling over an air interface, and the second bandwidth provides transmission and reception of signalling over the air interface.

4. An apparatus according to claim 1, wherein the apparatus is configured such that the first and second parts are configured to be moveable with respect to one another by at least one of sliding movement and rotatable movement with respect to one another.

5. The apparatus of claim 1, wherein the apparatus is configured such that the cavity has a first size in the first configuration and a second, larger size in the second configuration.

6. The apparatus of claim 1, wherein the apparatus is configured such that the cavity is substantially free of metal and/or plastics.

7. The apparatus of claim 1, wherein the apparatus is configured such that the cavity is defined and revealed within the apparatus.

8. An apparatus according to claim 1, wherein the antenna element is configured to be biased into or out of the cavity with movement of the apparatus between the first and second configurations.

9. An apparatus according to claim 1, wherein the antenna element is configured to have a first retracted position associated with the first configuration, and a second extended position with the second configuration, and wherein the antenna element is biased from the first retracted position towards and into the cavity in the second extended position.

10. The apparatus of claim 1 wherein the antenna element is fixed on the first or second part to be movable with the movement of the first or second part.

11. The apparatus of claim 1 wherein the antenna element is fixed on the first part and antenna element processing circuitry is comprised on the second part, and wherein the apparatus comprises one or more connection elements to allow the antenna element and the antenna element processing circuitry to remain connected during movement of the first and second parts.

12. The apparatus of claim 1 wherein the first and second parts are user-removable housings for the apparatus and the antenna element is comprised on one of the user-removable first and second parts.

13. The apparatus according to claim 1, wherein the antenna element is a diversity antenna element and is supplemental to an additional antenna element such that, when the apparatus is in the second configuration, the diversity antenna element has a sufficient second backspace to be efficiently useable in the second configuration, and when the apparatus is in the first configuration, the diversity antenna element is not efficiently useable.

14. The apparatus of claim 1 being a radio telecommunications device.

15. A method of operating an apparatus for radio communication, the apparatus comprising an antenna element and first and second parts, wherein the apparatus is configured such that the first and second parts are movable with respect to one another between first and second configurations, the method comprising moving the apparatus from the first configuration into the second configuration to provide first and second backspaces for the antenna element which can be each be used to provide respective first and second operational bandwidths for the antenna element, and wherein the apparatus is configured such that movement of the apparatus from the first configuration to the second configuration moves a cavity present in the first configuration over the antenna element in the second configuration cavity providing the second backspace for the antenna element.

16. An apparatus for radio communication comprising one or more antenna elements and first and second parts, wherein the apparatus is configured such that the first and second parts are movable with respect to one another between first and second configurations, and wherein the apparatus is configured such that movement of the apparatus from the first configuration into the second configuration provides respective first and second backspaces for the antenna element which can be each be used to provide respective first and second operational bandwidths for the one or more antenna elements, and wherein the apparatus is configured such that movement of the apparatus from the first configuration to the second configuration moves a cavity present in the first configuration over the one or more antenna elements in the second configuration, the cavity providing the second backspace for the one or more antenna elements.

* * * * *